US005971631A

United States Patent [19]

Poole et al.

[11] Patent Number: 5,971,631

[45] Date of Patent: Oct. 26, 1999

[54] OPTICAL WINDOWS

[76] Inventors: Neal John Poole, 80 Waysbrook, Letchworth, Hertfordshire SG6 2DW, United Kingdom; Jonathan Urwin, 1 Newlands Close East, Hitchin Hertfordshire SG4 9AZ, United Kingdom

[21] Appl. No.: 08/817,158

[22] PCT Filed: Oct. 12, 1995

[86] PCT No.: PCT/GB95/02416

§ 371 Date: Jun. 6, 1997

§ 102(e) Date: Jun. 6, 1997

[87] PCT Pub. No.: WO96/12211

PCT Pub. Date: Apr. 25, 1996

[30] Foreign Application Priority Data

Oct. 14, 1994 [GB] United Kingdom .................. 9420791

[51] Int. Cl.[6] .............................. G03B 17/00; H04N 7/18

[52] U.S. Cl. .......................... 396/427; 396/351; 348/143; 352/242

[58] Field of Search .............................. 396/25, 427, 429, 396/535, 439, 351; 352/242, 243; 348/143, 373, 146; 362/367

[56] References Cited

U.S. PATENT DOCUMENTS

| | | | |
|---|---|---|---|
| 3,160,227 | 12/1964 | Hautala | 352/242 |
| 3,889,052 | 6/1975 | Back | 178/6 |
| 3,895,226 | 7/1975 | Murray et al. | 362/367 |
| 4,225,881 | 9/1980 | Tovi | 358/108 |
| 4,355,329 | 10/1982 | Yoshida et al. | 348/143 |
| 4,356,540 | 10/1982 | Goralnik | 362/367 |
| 4,736,218 | 4/1988 | Kutman | 354/81 |
| 4,796,039 | 1/1989 | Pagano | 354/81 |
| 4,920,367 | 4/1990 | Pagano | 354/81 |
| 4,972,308 | 11/1990 | Chen | 362/367 |
| 4,978,984 | 12/1990 | Brookfield | 396/427 |

FOREIGN PATENT DOCUMENTS 2 141 306 12/1984 United Kingdom .

*Primary Examiner*—Alan A. Mathews

*Attorney, Agent, or Firm*—Walter C. Farley

[57] ABSTRACT

A surveillance camera assembly has an apparatus (9-15) for providing a rotatable field of view in a plane with a tilted mirror (15) rotatable about an axis normal to the plane, and a window (5) subtending at least a 90° field of view and as much as a substantially continuous 360° field of view in the plane. The window has a plurality of flat, parallel-surfaced panes (6) forming a polygon in the plane, each of the panes (6) having the same trapezoidal shape.

4 Claims, 2 Drawing Sheets

OPTICAL WINDOWS

FIELD OF THE INVENTION

This invention relates to transparent or partly transparent windows or similar components for optical systems, which cannot be formed as a single, flat plate owing to the wide viewing angle required. For example, the window may constitute transparent protection for a long-range camera.

BACKGROUND TO THE INVENTION

It is known to make clear and colored lens covers for warning lights in the form of cylinders, hemispheres and cones. In these contexts the precise behavior of an optical ray passing through the window is seldom significant, slight distortions are easily tolerated and indeed, some diffusion may be required or deliberately introduced.

For a device such as a long range camera, however, curvature in the window introduces progressively varying refractional effects across the field of view. This impairs the geometry of the incident beam at the camera by disturbing the notional parallelism and distribution of the incoming beam, and the resulting degradation of the image can become intolerable.

SUMMARY OF THE INVENTION

The invention is based on an improved enclosure window for use with an omni-directional optical system, which is preferably a long-range surveillance camera but might be an optical projector. The window is constituted as a number of angled, discrete plates or segmented areas with localised bends or narrow joints, rather than as a continuously curving surface. In this way, for example, a 360° window can be formed from, for example, seven or eight flat segments. A camera located within the window area and directed outwards will then, for most conditions, be operating through a single flat window region. When the line-of sight does include an interface between two such flat segments or panes, the resulting distortion of the image is relatively less pronounced to the eye, since unlike the situation with a continuously curved window, it then approximates to two distinct images almost super-imposed.

Any reasonable number of flat or substantially flat segments or panes of which the broad faces are flat and mutually parallel may be disposed about a curved profile to accommodate a desired viewing region, but for the most satisfactory performance the angle which each effectively subtends should be large in relation to the beam width of the optical device. Indeed, too many segments would cause the window to approximate a continuous curve and become subject to more complex image distortions. Preferably there are more than six and fewer than thirteen segments. Any solid angle subtended by a local bend or joint should be minimized to preserve the useful area of the window Various possible manufacturing methods exist. For example, an omni-directional window may be formed form a suitably shaped single sheet of semi-flexible transparent material by the machining of grooves on an inside surface to delineate the joints between the segments or panes and then folding the sheet along the length of each machined groove. A suitable adhesive may be applied sparingly at the machined grooves to improve the mechanical strength of the assembly. This method of manufacture provides a continuous external seal to the window without reliance on adhesive or other sealant.

Alternatively, separate plates may be cut to profiles and angles determined by the number of plates to be used, and chamfered at their abutting edges to provide mating surfaces at assembly. Adhesive or other sealant may be used for assembly if required, or to maintain an environmental protection.

A similar assembly may be obtained by injection molding, provided the flat surfaces are maintained over a sufficiently wide area of each window segment.

BRIEF DESCRIPTION OF THE DRAWING

Further features of the invention will be apparent from the following description, with reference to a preferred but non-limiting example shown in the accompanying drawings wherein.

DETAILED DESCRIPTION OF THE PREFERRED EMBODIMENT

Figure 1:
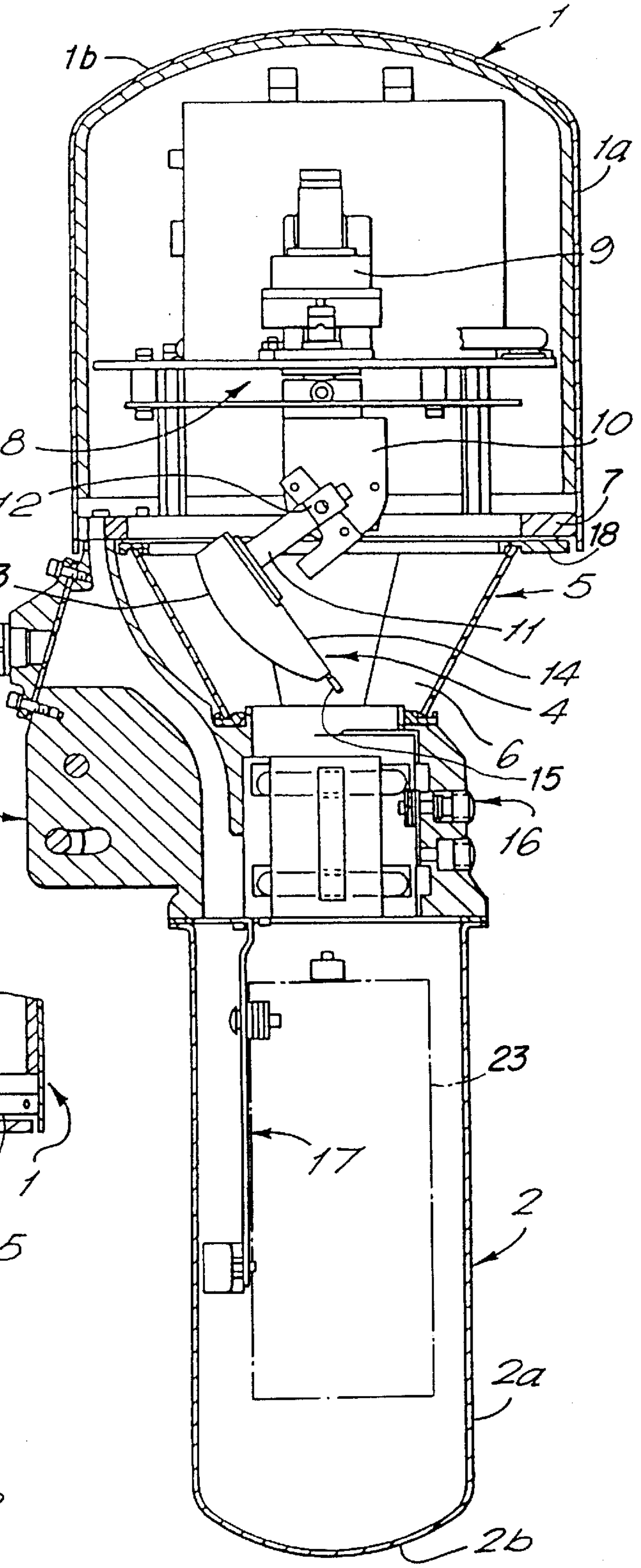
FIG. 1 illustrates in section a camera head assembly incorporating the present invention.

The example shown in the drawings is a mounting assembly for the elements of a high performance surveillance system in which the field of view of a television camera provided with, for example, a lens of focal length in the range 80–120 mm is adjusted by a mirror which has an adjustable tilt in the elevation plane and is rotatable through 360° in a scanning plane, usually in azimuth. Such an arrangement has particular operational advantages, these being that the camera can be maintained stationary, the field of view can be adjusted according to a programmed cycle and the assembly can be conveniently mounted on any suitable fixture.

Figure 2:
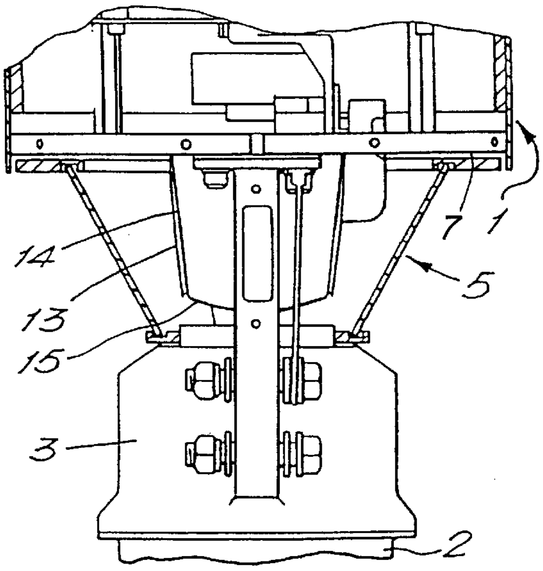
FIG. 2 is a cut-away sectional view of the assembly shown in FIG. 1, the view being at right angles to the view shown in FIG. 1.
Figure 3:
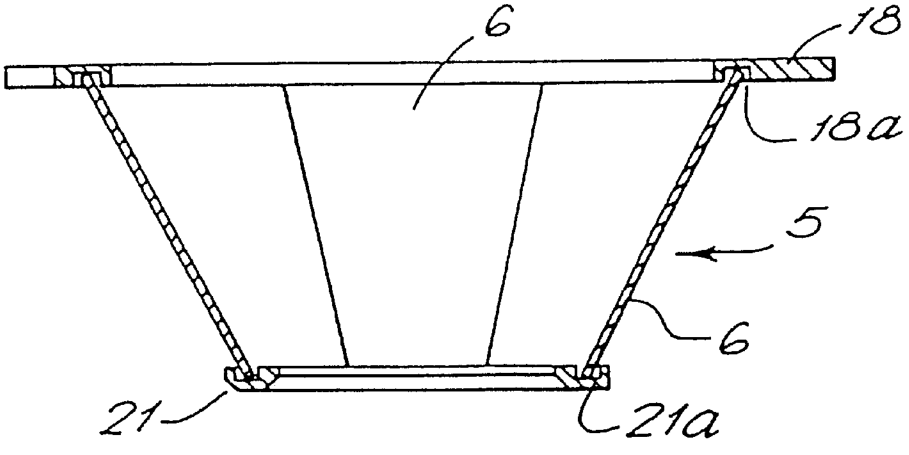
FIG. 3 is a sectional view of the scanning window shown in FIG. 2.
Figure 4:
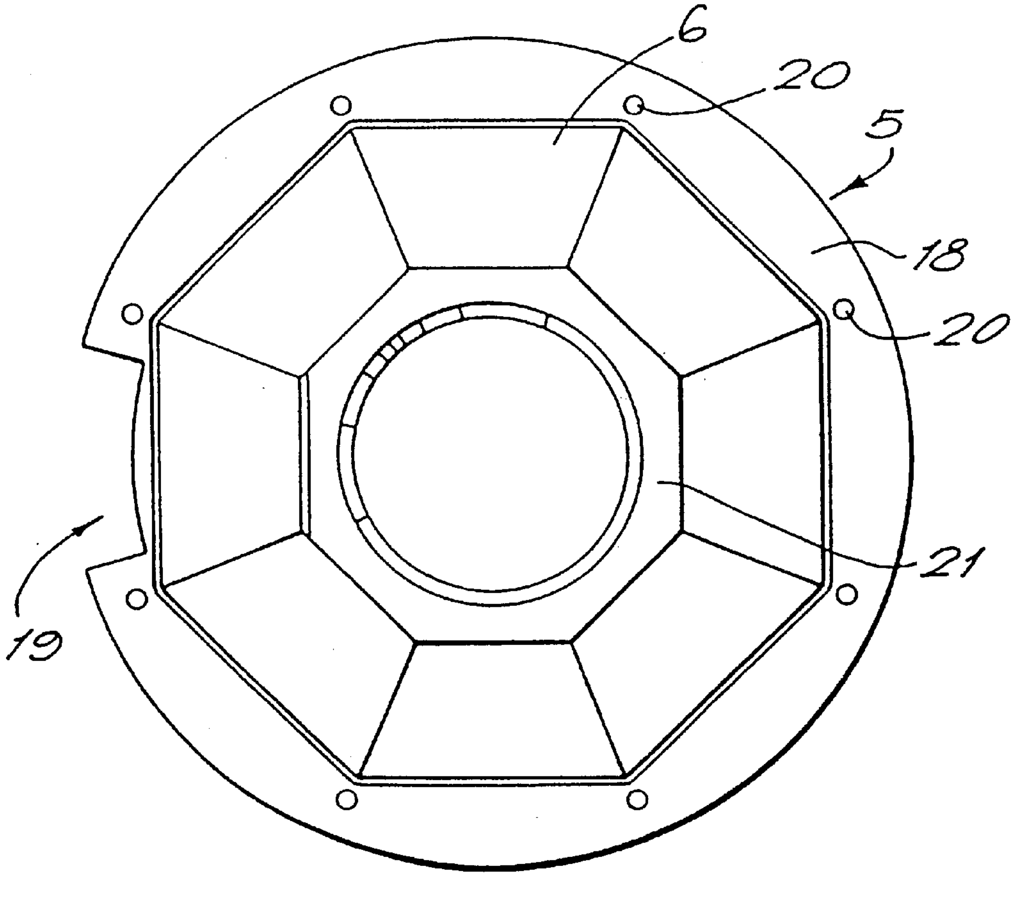
FIG. 4 is a plan view from above of the scanning window.

The assembly is shown in FIGS. 1 and 2 and the window is particularly shown in FIGS. 3 and 4. Details which are not relevant to the present invention are not described in the following.

The assembly chiefly consists of an upper housing 1, a lower housing 2, a mounting bracket 3, a rotatable mirror assembly 4, and a viewing window 5 which is preferably omni-directional in the azimuth plane. The window 5 comprises a multiplicity of similar panes 6 composed of flat plate-like segments of some suitable rigid transparent synthetic plastic material.

The upper housing 1 comprises a hollow cylindrical part 1*a* and a dome 1*b*. The lower housing 2, likewise, comprises a hollow cylindrical part 2*a*, in this embodiment of somewhat lesser diameter than the housing 1, and a dome 2*b*. The bracket 3 serves to connect and support the housings. The window 5 extends from a larger nominal diameter adjacent the lower extremity of the upper housing 1 to a smaller diameter at a position above the housing 2. The window is secured to an annualar bulkhead 7 in the lower part of the housing 1. This bulkhead supports a framework 8, of a construction not primarily relevant to the present invention, and a motor 9 which can rotate a bracket 10 about a vertical axis substantially coinciding with the central axis of the housings 1 and 2.

Bracket 10 serves as a mount for the mirror assembly 4 which can also rotate about a horizontal axis relative to the bracket 10. The assembly 4 comprises two conjoint arms 11 rotatable about a horizontal pivot 12, side plates 13, to provide a partial shield against extraneous light, and a plate 14 which carries a mirror 15 whereby an image of a field of view through the window extending in azimuth and elevation can be projected downwardly through a lens (not shown) secured in a lens mount 16 to a television camera 23, shown schematically in dash-dot lines, mounted on a bracket 17 within the housing 2. The construction of the lens mount, the camera mount and the lens and camera units are not directly relevant to the present invention.

Preferably the motor 9 can be controlled so as to traverse the field of view of the camera rapidly in the azimuth plane. It may be associated with a programable control system so that it can redirect the field of view to a succession of different positions in the azimuth plane. Likewise, the camera may be automatically controlled so as to pride a split screen view composed of images of a multiplicity of views (using appropriate frame stores) at the same time.

FIGS. 3 and 4 illustrate one example of a segmented window. The window consists of a multiplicity of similar panes, each of trapezoidel form, the panes 6 being supposed along their upper sides in a regular polygonal groove 18*a* in an annular plate 18 which has a locating cut-out 19 and a multiplicity of holes 20 enabling the plate to be secured to the plate 7 in the housing 1. Along their lower sides the panes 6 are supported in a regular polygonal groove 21*a* in an annular plate 21. In this example the window has eight panes.

The panes could be made from a single sheet of material by scoring along the lines corresponding to the joins between adjacent panes, but may be made separately and secured by a suitable adhesive both in the grooves in the plates 18 and 21 and together. It is important that the plates be parallel surfaced and it is desirable that they form a regular frustopyramid centered on the axis of rotation of the mirror and therefore the vertical axis of the optical path extending through the lens to the camera in the housing 2.

A scanning window of this nature is found to exhibit very little distortion of an image formed by the lens in the camera. In particular, the distortion is very much less than if a part-spherical scanning window were used. It is found in practice that even when the field of view of the camera includes a join between panes, the visibility of the pane at typical viewing distances (such as at least several tens of meters) is negligible, whereas the distortion introduced by curved windows is normally intolerable for viewing ranges normally associated with surveillance systems.

It is preferable but not essential for the normal to a pane to correspond approximately to the depression angle of the field of view.

We claim:

1. A surveillance camera assembly comprising a housing;

a camera mounted in said housing;

means (9–15) for providing a rotatable field of view in a plane, said means including a tilted mirror (15) rotatable relative to said camera and said housing about an axis normal to said plane; and a window (5) subtending a substantially continuous 360° field of view in said plane, said window comprising a plurality of flat, parallel-surfaced panes (6) forming a polygon in said plane, each of said panes (6) having the same trapezoidal shape.

2. An assembly according to claim 1 wherein said window comprises between six and 13 panes.

3. A surveillance camera assembly comprising a camera having a field of view with a sight axis;

means (9–15) for providing a rotatable field of view in a plane generally perpendicular to said sight axis, said means including a tilted mirror (15) rotatable about said sight axis; and a window (5) providing a field of view for said mirror through an angle of at least 90° in said plane, said window comprising a plurality of flat, parallel-surfaced panes (6) forming a polygon in said plane.

4. An assembly according to claim 3 wherein said window comprises between six and 13 panes.

* * * * *